(12) United States Patent
Takatsuji

(10) Patent No.: US 11,657,957 B2
(45) Date of Patent: May 23, 2023

(54) INDUCTOR AND DC-DC CONVERTER

(71) Applicant: Murata Manufacturing Co., Ltd., Kyoto-fu (JP)

(72) Inventor: Hiroyuki Takatsuji, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 693 days.

(21) Appl. No.: 15/833,219

(22) Filed: Dec. 6, 2017

(65) Prior Publication Data

US 2018/0166211 A1 Jun. 14, 2018

(30) Foreign Application Priority Data

Dec. 8, 2016 (JP) .............................. JP2016-238809

(51) Int. Cl.
*H01F 27/32* (2006.01)
*H01F 27/29* (2006.01)
(Continued)

(52) U.S. Cl.
CPC ........... *H01F 27/363* (2020.08); *H01F 17/04* (2013.01); *H01F 27/22* (2013.01); *H01F 27/24* (2013.01);
(Continued)

(58) Field of Classification Search
CPC ...... H01F 27/365; H01F 27/36; H01F 27/362; H01F 2017/008; H01F 27/24; H01F 27/29; H01F 27/292; H01F 27/2823
(Continued)

(56) References Cited

U.S. PATENT DOCUMENTS 3,979,706 A * 9/1976 Jennings ................. H01F 27/36
336/83
4,622,526 A * 11/1986 Schneider ............ H03H 1/0007
333/181
(Continued)

FOREIGN PATENT DOCUMENTS

CN 201278286 Y 7/2009
CN 204011008 U * 12/2014
(Continued)

OTHER PUBLICATIONS

An Office Action mailed by the Chinese Patent Office dated Jan. 31, 2019, which corresponds to Chinese Patent Application No. 201711274177.0 and is related to U.S. Appl. No. 15/833,219 with English language translation.
(Continued)

*Primary Examiner* — Mang Tin Bik Lian
*Assistant Examiner* — Joselito S. Baisa
(74) *Attorney, Agent, or Firm* — Studebaker & Brackett PC

(57) ABSTRACT

An inductor includes a core made from a metallic magnetic material, a wire wound around the core, a pair of outer electrodes coupled to respective end portions of the wire, a shielding member arranged so as to cover a top face and three or more side faces of the core, and an insulating member arranged between the core and the shielding member and having thermal conductivity. The thickness of the shielding member is set by applying the electric resistivity and permeability of the shielding member and the frequency of noise desired to be shielded to an expression for determining the depth of a skin of skin effect. The thickness of the insulating member is set according to the breakdown voltage of the insulating member and the voltage with which insu-
(Continued)

lation is desired to be ensured under a use environment of the inductor.

16 Claims, 5 Drawing Sheets

(51) Int. Cl.
    *H01F 27/24*     (2006.01)
    *H01F 27/28*     (2006.01)
    *H01F 17/04*     (2006.01)
    *H01F 27/36*     (2006.01)
    *H02M 3/156*     (2006.01)
    *H02M 1/14*     (2006.01)
    *H01F 27/22*     (2006.01)
    *H02M 1/44*     (2007.01)

(52) U.S. Cl.
    CPC ......... *H01F 27/2823* (2013.01); *H01F 27/29* (2013.01); *H01F 27/292* (2013.01); *H02M 1/143* (2013.01); *H02M 3/156* (2013.01); *H02M 1/44* (2013.01)

(58) Field of Classification Search
    USPC ....................................................... 336/84 R
    See application file for complete search history.

(56) References Cited

U.S. PATENT DOCUMENTS

| | | | | |
|---|---|---|---|---|
| 5,072,508 | A * | 12/1991 | Kaneko | H01F 27/292 29/605 |
| 5,266,739 | A * | 11/1993 | Yamauchi | H01G 4/228 257/787 |
| 5,457,872 | A * | 10/1995 | Sakata | H01F 41/076 29/605 |
| 5,753,549 | A * | 5/1998 | Lee | H01L 27/10835 438/386 |
| 7,426,780 | B2 * | 9/2008 | Lotfi | H01F 27/027 29/602.1 |
| 8,203,853 | B2 * | 6/2012 | Chen | H01F 17/062 336/65 |
| 8,350,367 | B2 * | 1/2013 | Chiu | H01L 23/552 257/659 |
| 8,528,190 | B2 * | 9/2013 | Lotfi | H01F 41/005 29/602.1 |
| 8,957,752 | B2 * | 2/2015 | Sharma | H05K 7/1432 336/90 |
| 9,001,524 | B1 * | 4/2015 | Akre | H01L 23/36 361/807 |
| 9,126,491 | B2 * | 9/2015 | Ichikawa | B60L 11/182 |
| 9,362,881 | B2 * | 6/2016 | Aizawa | H03H 7/0115 |
| 9,681,549 | B2 * | 6/2017 | Chen | H01F 27/292 |
| 9,748,802 | B2 * | 8/2017 | Krumme | A61B 6/4488 |
| 9,818,534 | B2 * | 11/2017 | Sakamoto | H01F 27/24 |
| 9,871,004 | B2 * | 1/2018 | Zhai | H01L 28/40 |
| 10,319,507 | B2 * | 6/2019 | Klesyk | H01F 27/027 |
| 10,438,737 | B2 * | 10/2019 | Sakamoto | H01F 27/24 |
| 10,446,309 | B2 * | 10/2019 | Blow | H01F 17/04 |
| 10,902,989 | B2 * | 1/2021 | Liu | H01F 17/045 |
| 11,004,595 | B2 * | 5/2021 | Yang | H01F 17/04 |
| 2006/0096088 | A1 * | 5/2006 | Lotfi | H01F 41/005 29/841 |
| 2007/0094863 | A1 * | 5/2007 | Ogawa | H01Q 7/06 29/605 |
| 2008/0036566 | A1 * | 2/2008 | Klesyk | H01F 27/027 29/605 |
| 2010/0127815 | A1 * | 5/2010 | Damnjanovic | H01F 27/289 336/840 |
| 2011/0115066 | A1 * | 5/2011 | Kim | H01L 21/565 257/690 |
| 2011/0175698 | A1 * | 7/2011 | Duh | H01F 17/045 336/212 |
| 2012/0139487 | A1 * | 6/2012 | Kim | B60L 11/1814 320/109 |
| 2012/0320558 | A1 | 12/2012 | Foster et al. | |
| 2013/0056847 | A1 * | 3/2013 | Chen | H01F 17/0013 257/531 |
| 2014/0002227 | A1 * | 1/2014 | Hsieh | H01F 5/00 336/200 |
| 2014/0312458 | A1 * | 10/2014 | Ashrafzadeh | H01L 25/0652 257/531 |
| 2015/0042416 | A1 * | 2/2015 | Aizawa | H03H 7/0115 333/185 |
| 2015/0287511 | A1 * | 10/2015 | Furukawa | H01F 27/02 336/84 R |
| 2015/0348707 | A1 * | 12/2015 | Hsieh | H01F 41/0206 29/17.2 |
| 2016/0066458 | A1 * | 3/2016 | Hirose | H05K 5/006 361/752 |
| 2017/0062360 | A1 * | 3/2017 | Chang | H01L 23/552 |
| 2017/0092594 | A1 * | 3/2017 | Song | H01L 21/4853 |

FOREIGN PATENT DOCUMENTS

| | | | |
|---|---|---|---|
| JP | S47-021490 | A | 10/1972 |
| JP | H06-260352 | A | 9/1994 |
| JP | H11-144980 | A | 5/1999 |
| JP | 2002-334954 | A | 11/2002 |
| JP | 2003-273562 | A | 9/2003 |
| JP | 2009-099766 | A | 5/2009 |
| JP | 2011-124373 | A | 6/2011 |
| JP | 2012-019031 | A | 1/2012 |
| JP | 2013-175564 | A | 9/2013 |
| JP | 2014-516212 | A | 7/2014 |
| JP | 2016-025218 | A | 2/2016 |
| WO | 2012/120594 | A1 | 9/2012 |
| WO | WO-2017068831 | A1 * | 4/2017 ............ H01F 27/36 |

OTHER PUBLICATIONS

An Office Action; "Notification of Reasons for Refusal," Mailed by the Japanese Patent Office dated Feb. 19, 2019, which corresponds to Japanese Patent Application No. 2016-238809 and is related to U.S. Appl. No. 15/833,219 ; with English language translation.

* cited by examiner

INDUCTOR AND DC-DC CONVERTER

CROSS-REFERENCE TO RELATED APPLICATION

This application claims benefit of priority to Japanese Patent Application No. 2016-238809, filed Dec. 8, 2016, the entire content of which is incorporated herein by reference.

BACKGROUND

Technical Field

The present disclosure relates to an inductor and a direct-current to direct-current (DC-DC) converter including the inductor.

Description of the Related Art

A DC-DC converter includes a switching element, a diode, an inductor (a power inductor), and a smoothing capacitor for example, and lowers or boosts a given direct-current voltage to a desired direct-current voltage. When, for example, the DC-DC converter is used as a power supply circuit of an electronic device in a car, noise radiated from an inductor of the DC-DC converter or the like can cause a problem for an AM radio installed in a car or the like. To suppress such noise radiated from the inductor, for example, a shielding member that covers the inductor is used.

As a power inductor of a DC-DC converter, for example, a metal-composite-type inductor small in size and ready for a large current is used, which is hereinafter referred to as a "metal composite inductor". The core of the metal composite inductor is formed from a metallic magnetic material. Thus, when a shielding member is used for the metal composite inductor, insulation is necessary between the shielding member and the core of the metal composite inductor.

As techniques to provide a shielding member and an insulating member, for example, Japanese Unexamined Patent Application Publication No. 2002-334954 discloses techniques to provide a resin film and a conductive film in an electronic device that includes an electronic component mounted over a mounting substrate, the resin film being bonded to the mounting substrate, the conductive film covering a face of the resin film opposite the electronic component and being electrically coupled to a grounding conductive unit of the mounting substrate. The resin film is formed from thermosetting resin, such as epoxy resin.

Further, Japanese Unexamined Patent Application Publication (Translation of PCT Application) No. 2014-516212 discloses techniques to provide a heat-shrink insulation structure and a conductive coating in an electromagnetic shielding structure for electromagnetically shielding electronic components on a substrate, the heat-shrink insulation structure being formed from a polymeric heat-shrink material and covering the electronic components, the conductive coating functioning as an electromagnetic shield in the heat-shrink insulation structure. The heat-shrink insulation structure is made from an insulating material that includes a thermal conductive material and formed by depositing the insulating material over a desired portion on the substrate, which is the portion including a plurality of electronic components, and partitioning the periphery of each electronic component. The conductive coating is formed by depositing a shielding material so as to cover the partitioned insulating material.

According to the techniques disclosed in Japanese Unexamined Patent Application Publication No. 2002-334954, however, the resin film provided between the electronic component and the conductive film is not formed from a material having thermal conductivity. Thus, when the electronic component is an inductor for example, it is difficult for the heat caused in the inductor to be radiated through the resin film and the temperature of the inductor can rise. As a result, in connection with the design, the rise in self temperature of the inductor can lead to drop in rated current.

In contrast, according to the techniques disclosed in Japanese Unexamined Patent Application Publication (Translation of PCT Application) No. 2014-516212, the heat-shrink insulation structure that covers the electronic components is formed from an insulating material that includes a thermal conductive material, and therefore heat radiation is provided. However, in the techniques disclosed in Japanese Unexamined Patent Application Publication (Translation of PCT Application) No. 2014-516212, the heat-shrink insulation structure is formed by depositing the insulating material so as to cover the electronic components on the substrate and the conductive coating is formed by depositing the shielding material over the heat-shrink insulation structure, and accordingly, the heat-shrink insulation structure and the conductive coating can be thicker than necessary. Besides, in the techniques disclosed in Japanese Unexamined Patent Application Publication (Translation of PCT Application) No. 2014-516212, the heat-shrink insulation structure and the conductive coating are provided so as to cover all of the electronic components on the substrate. Thus, increase in size can be caused by providing the heat-shrink insulation structure and the conductive coating as described above.

SUMMARY

The present disclosure has been conceived to address such problems and is aimed at providing an inductor and a DC-DC converter, which, in the inductor including a core made from a metallic magnetic material, has noise inhibitory effect by a shielding member, ensures insulation and heat radiation between the shielding member and the core of the inductor while enabling size reduction.

An inductor according to preferred embodiments of the present disclosure includes a core made from a metallic magnetic material, a wire wound around the core, a pair of outer electrodes coupled to respective end portions of the wire and provided on the core, a shielding member electrically coupled to a ground of the substrate and arranged to cover a top face and three or more side faces of the core, and an insulating member arranged between the core and the shielding member and having thermal conductivity, a thickness of the shielding member being set by applying electric resistivity of the shielding member, permeability of the shielding member, and a frequency of noise desired to be shielded by the shielding member to an expression for determining a depth of a skin of skin effect, a thickness of the insulating member being set according to a breakdown voltage of the insulating member and a voltage with which insulation is desired to be ensured by the insulating member under a use environment of the inductor.

In the inductor according to preferred embodiments of the present disclosure, the shielding member is provided so as to cover the top face and three or more side faces of the core and the shielding member is coupled to the ground of the substrate. The shielding member can shield noise caused in the inductor and suppress noise radiated to the outside. In the inductor according to preferred embodiments of the present disclosure, the insulating member having thermal conductivity is further provided between the shielding member and the core. The insulating member can ensure insulation between the core made from a metallic magnetic material and the shielding member. In addition, since the insulating member has thermal conductivity, heat radiation between the core and the shielding member can be ensured. In particular, in the inductor according to preferred embodiments of the present disclosure, the thickness of the shielding member is set by applying the frequency of the noise desired to be shielded to an expression for determining the depth of the skin of the skin effect and thus, the thickness of the shielding member can be decreased while inhibitory effect is exerted on the noise of the frequency desired to be shielded. Moreover, in the inductor according to preferred embodiments of the present disclosure, the thickness of the insulating member is set according to the breakdown voltage and the voltage with which insulation is desired to be ensured and thus, the thickness of the insulating member can be decreased while ensuring insulation with respect to the voltage with which insulation is desired to be ensured. Accordingly, the inductor that includes the shielding member and the insulating member can be reduced in size. As described above, the inductor according to preferred embodiments of the present disclosure, which includes the core made from a metallic magnetic material, has noise inhibitory effect by the shielding member, and insulation and heat radiation between the shielding member and the core of the inductor can be ensured while enabling size reduction.

In the inductor according to preferred embodiments of the present disclosure, it is preferable that the shielding member has a thickness within a range from 50 μm to 200 μm. In such a configuration, the frequency of the noise desired to be shielded includes a frequency that can affect an AM radio or the like and thus, the noise radiated from the inductor affecting an AM radio or the like can be suppressed while inhibiting increase in thickness of the shielding member.

In the inductor according to preferred embodiments of the present disclosure, it is preferable that the insulating member has a thickness within a range from 1 μm to 100 μm. Because of such a configuration, when the inductor is used in a car or the like, the voltage with which insulation is desired to be ensured includes the voltage of a power supply that can be used in the car or the like and thus, when the inductor is used in a car or the like, insulation between the shielding member and the core can be ensured while inhibiting increase in thickness of the insulating member.

In the inductor according to preferred embodiments of the present disclosure, it is preferable that the outer electrodes are provided on the bottom face of the core and the shielding member and the insulating member are arranged over the top face and all side faces of the core. Such a configuration enables noise in each direction caused in the inductor to be interrupted by the shielding member and can enhance the inhibitory effect on the noise radiated to the outside.

In the inductor according to preferred embodiments of the present disclosure, it is preferable that the outer electrodes are provided on a given side face of the core, and the shielding member and the insulating member are arranged over the top face and side faces except the given side face of the core. Such a configuration enables joining to a wiring pattern of the substrate using the outer electrodes provided on a side face of the core and thus, reliability of the joining between the outer electrodes and the wiring pattern of the substrate can be enhanced.

In the inductor according to preferred embodiments of the present disclosure, it is preferable that the shielding member and the insulating member are arranged over a portion of the given side face, the portion being not in contact with the outer electrodes. Such a configuration enables even noise toward a given side face caused in the inductor to be interrupted by the shielding member as much as possible and inhibitory effect on the noise radiated to the outside can be enhanced.

A DC-DC converter according to preferred embodiments of the present disclosure includes a switching element, a power inductor electrically coupled to the switching element, and a smoothing capacitor electrically coupled to the power inductor, and the power inductor is any one of the above-described inductors. Since the inductor including the above-described shielding member and insulating member is used as a power inductor, the DC-DC converter according to preferred embodiments of the present disclosure has inhibitory effect on the noise caused from the power inductor because of the shielding member, and insulation and heat radiation between the shielding member and the core of the power inductor can be ensured while enabling size reduction.

Other features, elements, characteristics and advantages of the present disclosure will become more apparent from the following detailed description of preferred embodiments of the present disclosure with reference to the attached drawings.

BRIEF DESCRIPTION OF THE DRAWINGS

FIG. 2A is a side view, FIG. 2B is a plan view, and FIG. 2C is a bottom view;

FIG. 5A is a side view, FIG. 5B is a plan view, and FIG. 5C is a bottom view.

DETAILED DESCRIPTION

Figure 1:
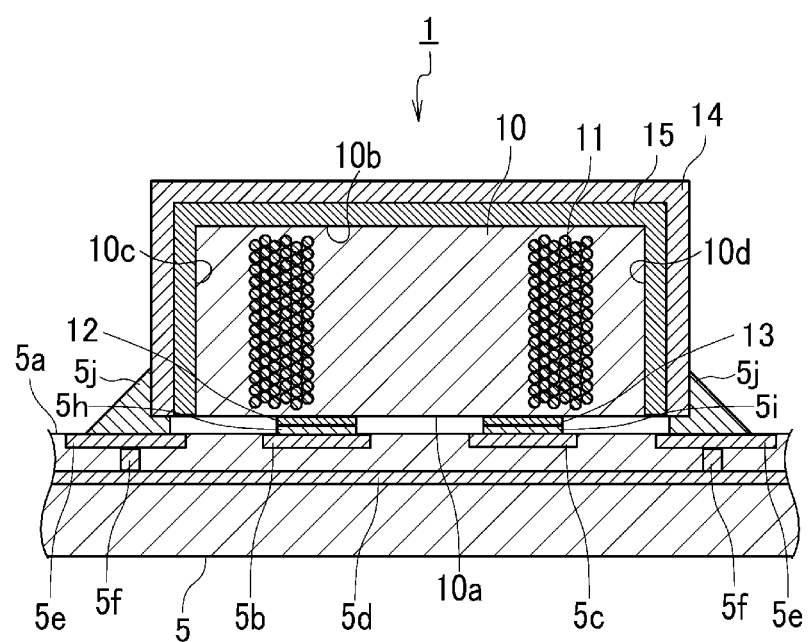
FIG. 1 is a cross-sectional view that schematically illustrates a configuration of an inductor according to a first embodiment.

Preferred embodiments of the present disclosure are described in detail below by referring to the drawings. In the drawings, identical references are used for identical or equivalent portions. In each drawing, identical references are given to identical elements, and overlapping descriptions thereof are omitted.

The use environment in the embodiments is an environment of use in a car and the inductor according to the present disclosure is applied to an inductor (a power inductor) of a DC-DC converter used as a power supply circuit of an electronic device in a car. Described below are two embodiments. The use environment is an environment concerning an object for which the inductor is used, which is particularly an environment concerning voltage.

First Embodiment

Figure 2A:
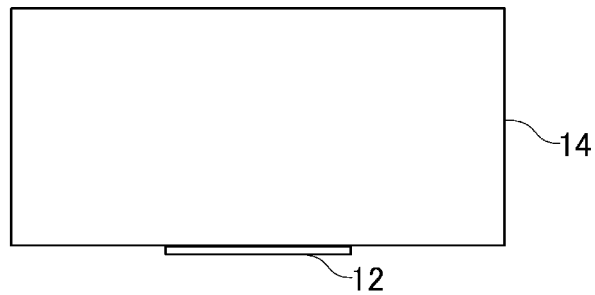
FIGS. 2A to 2C each schematically illustrate an external appearance of the inductor according to the first embodiment.
Figure 2B:
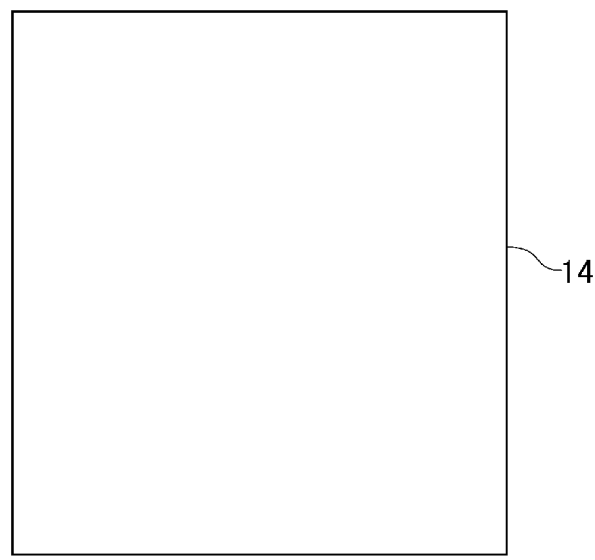
Figure 2C:
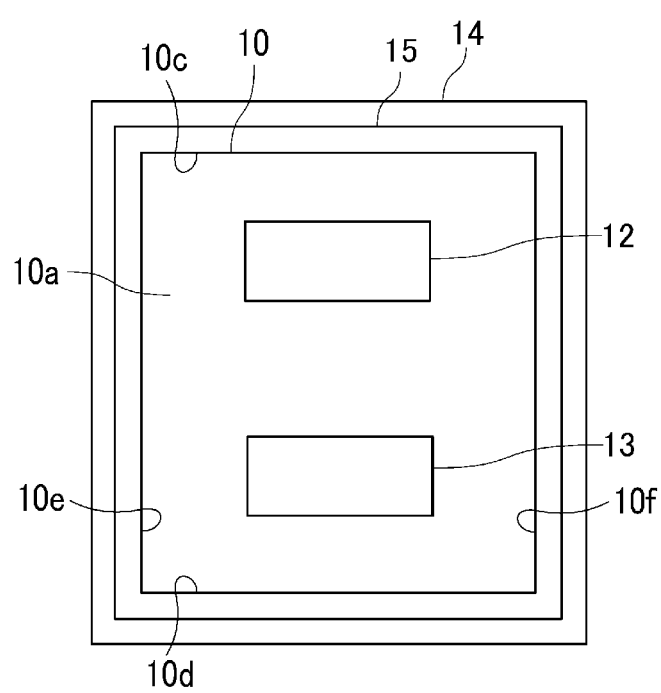
Figure 3:
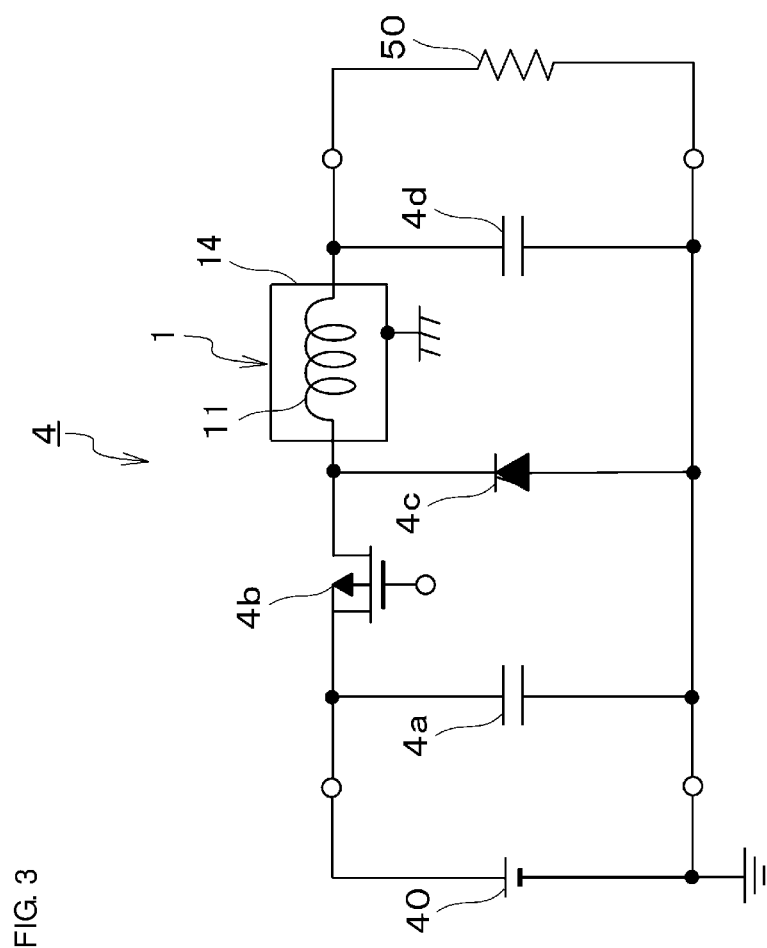
FIG. 3 is a circuit diagram of a DC-DC converter that includes the inductor according to the first embodiment.

An inductor 1 according to the first embodiment is described by referring to FIGS. 1 to 3. FIG. 1 is a cross-sectional view that schematically illustrates a configuration of the inductor 1 according to the first embodiment. FIGS. 2A to 2C each schematically illustrate an external appearance of the inductor 1 according to the first embodiment, and FIG. 2A is a side view, FIG. 2B is a plan view, and FIG. 2C is a bottom view. FIG. 3 is a circuit diagram of a DC-DC converter 4 that includes the inductor 1 according to the first embodiment. FIG. 1 depicts the inductor 1 and part of a substrate 5 over which the inductor 1 is mounted.

The inductor 1 is a power inductor used as one of electronic components of the DC-DC converter 4. The DC-DC converter 4 that includes the inductor 1 is mounted over the substrate 5. The DC-DC converter 4 is described by referring to FIG. 3 before describing the inductor 1 in detail.

For example, the DC-DC converter 4 lowers (converts) a given direct-current voltage input from a power supply 40 to a desired direct-current voltage and outputs the lowered voltage to an electric load 50. For example, the DC-DC converter 4 is used as a power supply circuit of an electronic device in a car and lowers the voltage of the power supply (battery) 40 from about 12 V to about 5 V and outputs the lowered voltage to the electric load 50. The DC-DC converter 4 is a chopper (switching) DC-DC converter.

As illustrated in FIG. 3, for example, the DC-DC converter 4 includes a capacitor 4a on the input side, a switching element 4b, a diode 4c, the inductor 1, a capacitor 4d on the output side, and these electronic components are mounted over the substrate 5. On the substrate 5, wiring patterns are formed, which are a ground pattern, a power supply pattern, and a signal pattern. The switching element 4b undergoes switching control by a controller or the like, which is not illustrated, and is turned on or off according to a predetermined switching frequency. As the switching element 4b, for example, a metal oxide semiconductor field-effect transistor (MOSFET) is preferably used. The switching frequency of the switching element 4b is about 100 kHz to 400 kHz for example.

Operations of the DC-DC converter 4 are described below. When the switching element 4b is turned on, current flows into the inductor 1. In this case, the inductor 1 generates electromotive force by self induction action so as to block the current that flows in and accumulates energy. When the switching element 4b is turned off, the flow of the current into the inductor 1 is stopped. In this case, the inductor 1 causes the accumulated energy to flow to the output side as current so as to maintain the flow of current. The voltage caused by the switching is smoothed by the capacitor 4d and output to the electric load 50.

In the DC-DC converter 4 that operates as described above, the inductor 1 causes noise (electric-field noise or magnetic-field noise), depending on the switching by the switching element 4b. When the noise is radiated to the outside and when the DC-DC converter 4 is used in a car for example, the radiated noise can propagate to a car-mounted AM radio and in this case, the noise can intrude into voice from the radio. To suppress such noise radiated to the outside from the inductor 1, the inductor 1 has a shielding function. Hereinafter, the inductor 1 is described.

The inductor 1 is a metal composite inductor. As the inductor 1, for example, a wire-type inductor is preferably used. For another example, a laminated inductor is also useable as the inductor 1. The inductor 1 includes a core 10, a wire 11, a pair of outer electrodes 12 and 13, a shielding member 14, and an insulating member 15.

The core 10 is made from a metallic magnetic material. The core 10 is substantially shaped like a rectangular parallelepiped for example. The wire 11 is formed by a conductor, such as copper, being wound around the core 10. Both end portions of the wire 11 are brought out to a bottom face 10a of the core 10. For example, the wire 11 is wound vertically.

The outer electrodes 12 and 13 are terminal electrodes for mounting the inductor 1 over the substrate 5. The outer electrodes 12 and 13 are arranged on the bottom face 10a of the core 10. The outer electrodes 12 and 13 are constituted of conductors. The outer electrodes 12 and 13 are each substantially shaped like a flat plate for example. The outer electrode 12 is electrically coupled to one of the end portions of the wire 11. The outer electrode 12 is electrically coupled to a coupling point of the switching element 4b and the diode 4c of the DC-DC converter 4 by being coupled using a solder 5h to a power supply pattern 5b provided on a top face 5a of the substrate 5. The other outer electrode 13 is electrically coupled to the other end portion of the wire 11. The outer electrode 13 is electrically coupled to one end of the capacitor 4d on the output side in the DC-DC converter 4 by being coupled using a solder 5i to a power supply pattern 5c provided on the top face 5a of the substrate 5.

The shielding member 14 is a member for shielding noise caused in the inductor 1. The shielding member 14 is formed from a metallic material and has conductivity. The metallic material is copper for example. The shielding member 14 is substantially shaped like a continuous plane without any slits or holes. As the shielding member 14, for example, a metal plate is preferably used. For another example, a metallic foil or a metal-evaporated film is also useable as the shielding member 14. Since the core 10 is formed from a metallic magnetic material, insulation is necessary between the shielding member 14 and the core 10.

The shielding member 14 is arranged so as to cover a top face 10b and four side faces 10c, 10d, 10e, and 10f of the core 10. In this manner, the shielding member 14 covers all faces of the core 10 except the bottom face 10a. When the inductor 1 is mounted over the substrate 5, a ground plane 5d provided in the substrate 5 is positioned below the core 10. The shielding member 14 is coupled using a solder 5j to a ground pattern 5e provided on the top face 5a of the substrate 5. In the substrate 5, the ground pattern 5e is electrically coupled to the ground plane 5d with a via 5f interposed therebetween.

In particular, the thickness of the shielding member 14 is set so as to be a small thickness within a range that allows noise inhibitory effect to be exerted, which is particularly inhibitory effect on noise that affects an AM radio. To set the thickness of the shielding member 14, a relational expression of skin effect is used. The skin effect is a phenomenon in which high-frequency current flows closer to the surface of a conductor as the frequency thereof is higher. When for example, high-frequency current with a predetermined frequency is caused to flow in a conductor, the current flows within the depth of the skin from the surface of the conductor, which corresponds to the predetermined frequency, and does not flow in a portion beyond the depth of the skin from the surface of the conductor. Thus, it is sufficient for the shielding member 14 to have a thickness that is substantially equivalent to the depth of the skin corresponding to the frequency of the noise desired to be suppressed so as to drop the noise to the ground of the substrate 5.

The thickness of the shielding member 14 is set using a value calculated in Expression (1) below. Expression (1) determines the depth of the skin. In Expression (1), t1 represents the depth of the skin and in the present embodiment, represents the thickness of the shielding member 14. In Expression (1), ρ represents the electric resistivity of the conductor and in the present embodiment, represents the electric resistivity of the shielding member 14. In Expression (1), μ represents the permeability of the conductor and in the present embodiment, represents the permeability of the shielding member 14. In Expression (1), f represents the frequency of the current and in the present embodiment, represents the frequency of the noise desired to be shielded by the shielding member 14.

In Expression (1), 2πf represents the angular frequency of the current.

$$t1 = \sqrt{\frac{2\rho}{2\pi f \mu}} \qquad (1)$$

When the thickness t1 of the shielding member 14 is set by substituting the frequency f of the noise desired to be shielded into Expression (1), the thickness of the shielding member 14 needs to be larger as the frequency of the noise desired to be shielded is lower, and the thickness of the shielding member 14 may be smaller as the frequency is higher.

In the present embodiment, the inductor 1 is applied to the power inductor of the DC-DC converter 4 of an electronic device in a car and thus, the thickness of the shielding member 14 is set so as not to allow the electric-field noise or magnetic-field noise radiated from the inductor 1 to affect an AM radio installed in the car. As described above, since the switching frequency of the switching element 4b of the DC-DC converter 4 is about 100 kHz to 400 kHz, the lower-limit frequency of the noise desired to be shielded, which is noise with a fundamental wave, is set to about 100 kHz. Further, since the frequency band used by an AM radio is about 500 kHz to 1800 kHz, the upper-limit frequency of the noise desired to be shielded, which is noise with a harmonic, is set to about 1800 kHz.

When for example, copper is used as the metallic material for the shielding member 14, the electric resistivity of the copper, which substantially equals $1.68 \times 10^{-8}$ Ωm, is used as the electric resistivity ρ of the shielding member 14 and the permeability of the copper, which substantially equals $1.256 \times 10^{-6}$ H/m, is used as the permeability μ of the shielding member 14. When the thickness t1 of the shielding member 14 is determined by substituting the electric resistivity and permeability of the copper and 100 kHz as the lower-limit frequency into Expression (1), the determined thickness t1 is about 200 μm. When the thickness t1 of the shielding member 14 is determined by substituting the electric resistivity and permeability of the copper and 1800 kHz as the upper-limit frequency into Expression (1), the determined thickness t1 is about 50 μm.

The thickness of the shielding member 14 is set to a preferable value within a range from about 50 μm to 200 μm. When for example, noise of about 1800 kHz largely affects an AM radio, the noise inhibitory effect can be obtained even by decreasing the thickness of the shielding member 14 to about 50 μm. When the thickness of the shielding member 14 is set to about 200 μm, the noise inhibitory effect can be exerted on noise of the lowest frequency to noise of the highest frequency that can affect an AM radio. When an FM radio is installed in a car, the FM radio uses a frequency band higher than that used for an AM radio and thus, the inhibitory effect is also exerted on noise that affects an FM radio by using the shielding member 14 having the thickness within a range from about 50 μm to 200 μm.

The insulating member 15 prevents electrical shorting (ensures electric insulation) between the core 10 made from a metallic magnetic material and the shielding member 14. Further, the insulating member 15 enhances heat radiation of the heat caused in the inductor 1. The insulating member 15 is formed from an insulative material having thermal conductivity and has thermal conductivity and electric insulation properties. The insulative material having thermal conductivity is a resin material having thermal conductivity and for example, is epoxy resin filled with a filler of alumina. As the insulating member 15, for example, a substantially sheet-like member is preferably used.

The insulating member 15 is arranged between the core 10 and the shielding member 14. For example, the insulating member 15 is provided in close contact with the surface of the core 10. The insulating member 15 is provided in all of the portion where the shielding member 14 is arranged. Thus, the insulating member 15 is provided on all of the faces of the core 10 except the bottom face 10a, that is, on the top face 10b and the four side faces 10c, 10d, 10e, and 10f.

In particular, the thickness of the insulating member 15 is set so as to be a small thickness within a range that can sufficiently ensure insulation. The thickness of the insulating member 15 is calculated with Expression (2) below, which uses a breakdown voltage and a distance that can ensure insulation. In Expression (2), t2 represents the distance that can ensure insulation and in the present embodiment, represents the thickness of the insulating member 15. In Expression (2), v represents a voltage that can ensure insulation and in the present embodiment, represents the voltage with which insulation is desired to be ensured by the insulating member 15. In Expression (2), d represents the breakdown voltage and in the present embodiment, represents the breakdown voltage of the insulating member 15. The breakdown voltage changes, depending on the insulative material of the insulating member 15.

$$t2 = \frac{v}{d} \qquad (2)$$

When the thickness t2 of the insulating member 15 is set by substituting the voltage v with which insulation is desired to be ensured into Expression (2), the thickness of the insulating member 15 needs to be larger as the voltage v with which insulation is desired to be ensured is higher, and the thickness of the insulating member 15 may be smaller as the voltage v is lower.

In the present embodiment, since the inductor 1 is applied to the power inductor of the DC-DC converter 4 of an electronic device in a car and thus, the thickness of the insulating member 15 is set so that insulation can be ensured with respect to the voltage of the power supply used in the car. Since a 12 V-system battery for auxiliary equipment is installed in the car as the power supply, the voltage of the lower limit with which insulation is desired to be ensured is set to about 12 V in view of the 12 V-system battery. When the car includes an electric motor as a driving source, a high-voltage battery of about several hundreds of volts is installed as the power supply of the electric motor and thus, the upper-limit voltage with which insulation is desired to be ensured is set to about 1000 V in view of the battery for the electric motor. In the present embodiment, for example, when the insulative material of the insulating member 15 is a resin material, the breakdown voltage is within a range from about 10000 V/mm to 50000 V/mm and thus, about 10000 V/mm is used as the breakdown voltage.

When the thickness t2 of the insulating member 15 is determined by substituting the lower-limit voltage with which insulation is desired to be ensured, which is about 12 V, and the breakdown voltage, which is about 10000 V/mm, into Expression (2), the determined thickness t2 is about 1 μm. When the thickness t2 of the insulating member 15 is determined by substituting the upper-limit voltage with which insulation is desired to be ensured, which is about 1000 V, and the breakdown voltage, which is about 10000 V/mm, into Expression (2), the determined thickness t2 is about 100 μm.

The thickness of the insulating member 15 is set to a preferable value within a range from about 1 μm to 100 μm. When for example, no high-voltage battery is installed in the car, insulation can be ensured even by decreasing the thickness of the insulating member 15 to about 1 μm. When a high-voltage battery is installed and an electric motor is provided in the car as a driving source, insulation can be sufficiently ensured by setting the thickness of the insulating member 15 to about 100 μm. In particular, a thickness smaller than about 100 μm can be set by setting the thickness of the insulating member 15 using Expression (2) in view of the voltage of the high-voltage battery actually installed.

Action of the shielding member 14 in the inductor 1 is described. In the inductor 1, during switching of the switching element 4b at a predetermined switching frequency, electric-field noise or magnetic-field noise is caused. Since the shielding member 14 coupled to the ground of the substrate 5 is provided around the core 10 of the inductor 1, the shielding member 14 can shield such electric-field or magnetic-field noise. In particular, since the continuous shielding member 14 without any slits or holes is provided, magnetic-field noise can be shielded. Thus, electric-field noise or magnetic-field noise radiated to the outside of the inductor 1 can be reduced. In particular, since the shielding member 14 is provided on all of the faces around the core 10 except the bottom face 10a, the shielding member 14 can interrupt electric-field noise or magnetic-field noise in all directions.

In particular, for the shielding member 14, a preferable thickness within a range from about 50 μm to 200 μm corresponding to the frequencies of about 100 kHz to 1800 kHz that can affect an AM radio is set using Expression (1). Thus, when noise of a frequency that affects an AM radio is caused in the inductor 1, the noise can escape to the ground of the substrate 5 through the shielding member 14. Consequently, noise of a frequency that affects an AM radio and is radiated to the outside can be reduced and noise of the AM radio can be suppressed.

Action of the insulating member 15 in the inductor 1 is described. The core 10 of the inductor 1 is formed from a metallic magnetic material. Since the insulating member 15 is provided between the core 10 and the shielding member 14, the insulating member 15 can prevent electrical shorting between the core 10 and the shielding member 14. In particular, for the insulating member 15 made from a resin material, a preferable thickness within a range from about 1 μm to 100 μm corresponding to a voltage of about 12 V to 1000 V in view of the voltage of the battery installed in a car is set using Expression (2). Thus, the insulating member 15 can ensure insulation with respect to the voltage of the battery installed in a car. Further, since the insulating member 15 is formed from a material having thermal conductivity, heat caused in the inductor 1 is released to the outside through the insulating member 15 and the metallic shielding member 14.

The ground plane 5d of the substrate 5 is provided below the inductor 1. The ground plane 5d shields electric-field noise or magnetic-field noise radiated downward from the inductor 1. Thus, the electric-field noise or magnetic-field noise radiated downward from the inductor 1 can be reduced. Further, heat caused in the inductor 1 can be easily conducted all over the substrate 5 through the ground plane 5d and heat radiation effect can be enhanced.

In the inductor 1 according to the first embodiment, the shielding member 14 having a thickness within a range from about 50 μm to 200 μm is provided so as to cover the core 10 and thus, noise inhibitory effect, particularly inhibitory effect on noise that can affect an AM radio installed in a car, can be exerted.

In addition, in the inductor 1 according to the first embodiment, the insulating member 15 having a thickness within a range from about 1 μm to 100 μm is provided between the shielding member 14 and the core 10 and thus, insulation, particularly insulation in a car, between the shielding member 14 made from a metallic material and the core 10 made from a metallic magnetic material can be ensured. Further, in the inductor 1 according to the first embodiment, the insulating member 15 is formed from an insulating material having thermal conductivity and thus, heat radiation effect can be enhanced. With the enhancement in heat radiation effect of the inductor 1, drop in rated current based on rise in self temperature of the inductor 1 can be suppressed.

Moreover, in the inductor 1 according to the first embodiment, the thickness of the shielding member 14 is set to a preferable value within a range from about 50 μm to 200 μm using Expression (1) for determining the depth of the skin of the skin effect and thus, the thickness of the shielding member 14 can be decreased within a range that allows the noise inhibitory effect to be exerted. Further, in the inductor 1 according to the first embodiment, the thickness of the insulating member 15 is set to a preferable value within a range from about 1 μm to 100 μm by Expression (2) that uses the breakdown voltage and the voltage with which insulation is desired to be ensured and thus, the thickness of the insulating member 15 can be decreased within a range that can ensure insulation. Since the thicknesses of the shielding member 14 and the insulating member 15 can be decreased as described above, the inductor 1 provided with the shielding member 14 and the insulating member 15 can be reduced in size. In addition, the weight can be reduced and costs can be cut by decreasing the thicknesses of the shielding member 14 and the insulating member 15.

Further, in the inductor 1 according to the first embodiment, the outer electrodes 12 and 13 are provided on the bottom face 10a of the core 10, and the shielding member 14 and the insulating member 15 are arranged over the top face 10b and the four side faces 10c, 10d, 10e, and 10f of the core 10 and thus, noise caused in the inductor 1 in each direction can be effectively interrupted by the shielding member 14 and the inhibitory effect on the noise radiated to the outside can be enhanced.

Second Embodiment

Figure 4:
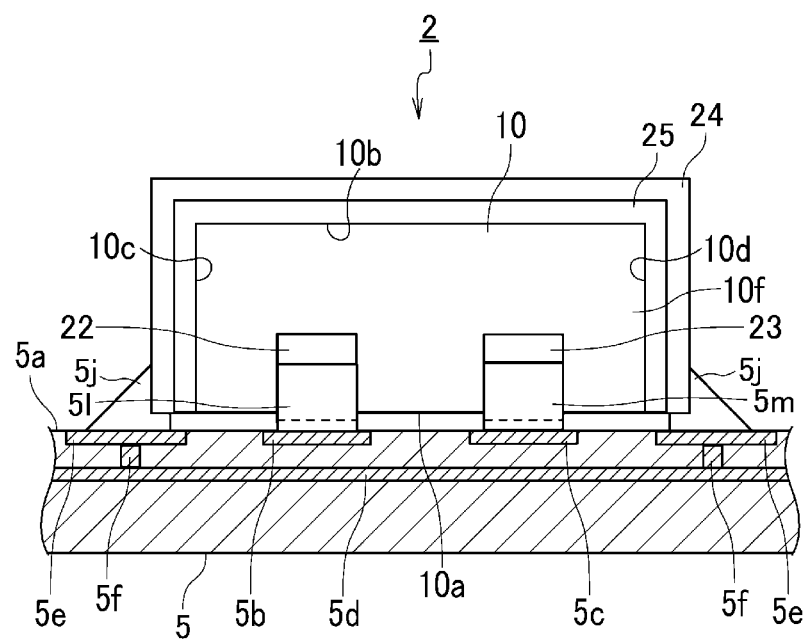
FIG. 4 is a cross-sectional view that schematically illustrates a configuration of an inductor according to a second embodiment.

An inductor 2 according to the second embodiment is described by referring to FIGS. 4 and 5. FIG. 4 is a cross-sectional view that schematically illustrates a configuration of the inductor 2 according to the second embodiment.

Figure 5A:
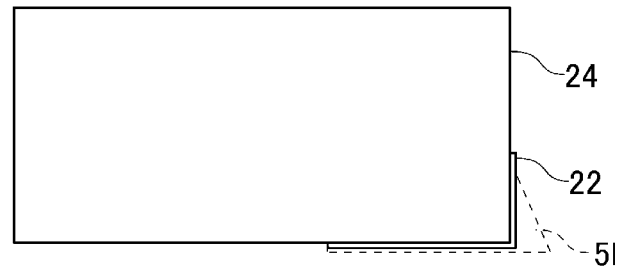
FIGS. 5A to 5C each schematically illustrate an external appearance of the inductor according to the second embodiment.
Figure 5B:
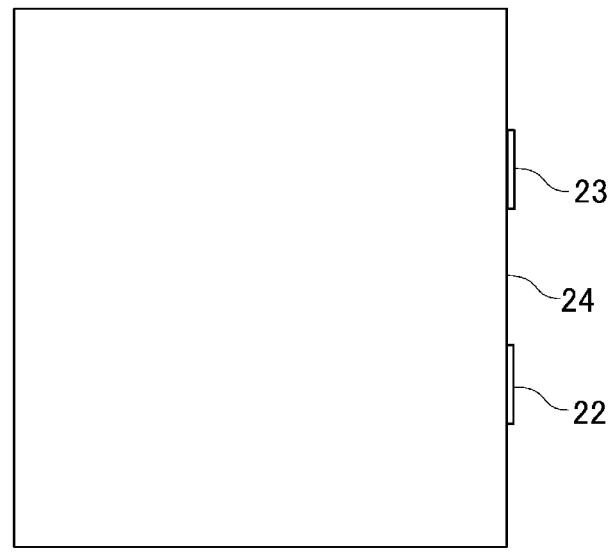
Figure 5C:
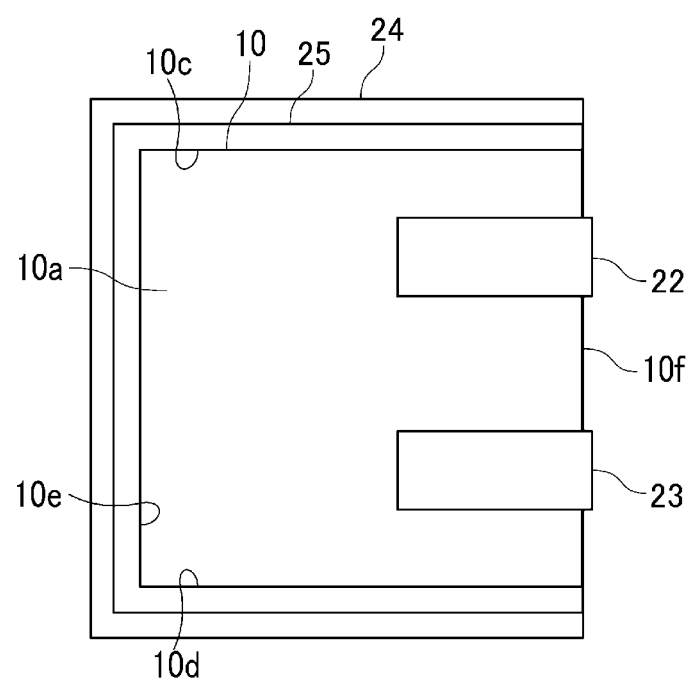

FIGS. 5A to 5C each schematically illustrate an external appearance of the inductor 2 according to the second embodiment, and FIG. 5A is a side view, FIG. 5B is a plan view, and FIG. 5C is a bottom view. FIG. 4 depicts cross sections of the inductor 2 and part of a substrate 5 over which the inductor 2 is mounted.

The inductor 2 is different from the inductor 1 according to the first embodiment in that the outer electrodes are provided on a side face of the core, and the shielding member and the insulating member are not provided on the side face. The inductor 2 includes a core 10 and a wire 11 similar to those of the inductor 1. The inductor 2 further includes a pair of outer electrodes 22 and 23, a shielding member 24, and an insulating member 25.

The outer electrodes 22 and 23 are terminal electrodes for mounting the inductor 2 over the substrate 5. The outer electrodes 22 and 23 are arranged from a bottom face 10a of the core 10 to a side face 10f. The outer electrodes 22 and 23 are each substantially shaped like a flat plate and the cross sections thereof are each substantially shaped like an L. The outer electrode 22 is coupled using a solder 5l to a power supply pattern 5b provided on a top face 5a of the substrate 5. The other outer electrode 23 is coupled using a solder 5m to a power supply pattern 5c provided on the top face 5a of the substrate 5. In particular, in the outer electrodes 22 and 23, each portion along the bottom face 10a of the core and also, each portion along the side face 10f of the core 10 are joined using the solders 5l and 5m to the power supply patterns 5b and 5c, respectively. FIG. 5A depicts the solder 5l for joining the outer electrode 22.

The shielding member 24 is different from the shielding member 14 according to the first embodiment in that the shielding member 24 is not provided on the side face 10f of the core 10 on which the outer electrodes 22 and 23 are provided. Thus, the shielding member 24 is arranged so as to cover a top face 10b and three side faces 10c, 10d, and 10e of the core 10.

The insulating member 25 is different from the insulating member 15 according to the first embodiment in that the insulating member 25 is not provided on the side face 10f of the core 10 on which the outer electrodes 22 and 23 are provided. Thus, the insulating member 25 is arranged on the top face 10b and the side faces 10c, 10d, and 10e of the core 10.

The inductor 2 according to the second embodiment brings action and advantages similar to those obtained in the first embodiment. On the side face 10f of the core 10, however, the shielding member 24 is not provided and thus, noise inhibitory effect is exerted in directions except the direction of the side face 10f. Since the inductor 2 is a vertically wound type, noise can be easily radiated upward and downward from the inductor 2. For the noise radiated upward and downward, the shielding member 24 is provided over the top face 10b of the core 10 of the inductor 2 and a ground plane 5d of the substrate 5 is provided below the inductor 2 and thus, the noise can be suppressed efficiently. Further, since the shielding member 24 and the insulating member 25 are not provided on the side face 10f of the core 10, heat radiation effect can be enhanced.

In particular, in the inductor 2 according to the second embodiment, the outer electrodes 22 and 23 are provided on the side face 10f of the core 10 and thus, reliability of the joining of the outer electrodes 22 and 23 to the power supply patterns 5b and 5c of the substrate 5 can be enhanced.

Although the embodiments of the present disclosure are described above, the present disclosure is not limited to the above-described embodiments but sundry variations are possible. For example, although in the above-described embodiment, the inductor according to the present disclosure is applied to the inductor 1 (the power inductor) of the DC-DC converter 4 as a power supply circuit of an electronic device in a car, the inductor according to the present disclosure may be applied to an inductor used for an electronic circuit other than a DC-DC converter and may also be applied to an inductor (a power inductor) of a DC-DC converter used in a place other than a car.

Although in the above-described embodiment, the inductor according to the present disclosure is applied to the inductor 1 including the core 10 that is substantially shaped like a rectangular parallelepiped, the inductor according to the present disclosure may be applied to an inductor including a core substantially having a shape other than a rectangular parallelepiped, such as a hemisphere, a cylinder, or a polyhedron. When the shape of the core is not a substantially rectangular parallelepiped, the three or four side faces on which the shielding member and the insulating member are provided are constituted of two faces opposite each other across the core, and one or two faces linked to each side end portion of the aforementioned two faces. The top face is linked to each upper end portion of the aforementioned three or four side faces.

Although in the above-described embodiment, the thickness of the shielding member 14 is set to a thickness within a range from about 50 μm to 200 μm, depending on the metallic material used for the shielding member or the frequency of the noise desired to be shielded by the shielding member, the thickness of the shielding member may be set as appropriate using Expression (1).

Although in the above-described embodiment, the thickness of the insulating member 15 is set to a thickness within a range from about 1 μm to 100 μm, the thickness of the insulating member may be set as appropriate using Expression (2), depending on the breakdown voltage of the insulating member, which is the voltage dependent on the insulative material, and the voltage with which insulation is desired to be ensured by the insulating member in an environment where the inductor is used.

Although in the above-described embodiment, the ground plane 5d (the ground pattern) is provided in the substrate 5 below the core 10 of the inductor 1, the ground pattern may be provided below the core 10 of the inductor 1 and on a surface of the substrate 5, such as the top face 5a, except the portions for the outer electrodes 12 and 13.

Although in the above-described second embodiment, the outer electrodes 22 and 23 are provided on the side face 10f of the core 10 while the shielding member 24 and the insulating member 25 are not provided on the side face 10f, the shielding member 24 and the insulating member 25 may also be provided over a portion of the side face 10f while the portion is not in contact with the outer electrodes 22 and 23.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor mounted over a substrate, the inductor comprising:
    a core made from a metallic magnetic material;
        a wire wound around the core, a winding axis of the wire extending in a direction away from a surface of the substrate at which the inductor is mounted;

a pair of outer electrodes coupled to respective end portions of the wire and provided on the core, such that an inner edge of each of the electrodes is at a distance from the winding axis that is less than a distance from the wire to the winding axis in a cross-sectional view, and outer edges of the electrodes are positioned between an innermost winding of the wire that is closest to the winding axis in the cross-sectional view and an outermost winding of the wire that is furthest away from the winding axis in the cross-sectional view;

a shielding member electrically coupled to a ground of the substrate and arranged to cover a top face and at least three side faces of the core, a thickness t1 of the shielding member being set by applying electric resistivity ρ of the shielding member, permeability μ of the shielding member, and a frequency f of noise desired to be shielded by the shielding member, to an expression $$t1 = \sqrt{\frac{2\rho}{2\pi f \mu}}$$

for determining a depth of a skin of skin effect; and an insulating member arranged between the core and the shielding member and having thermal conductivity, a thickness of the insulating member being set according to a breakdown voltage of the insulating member and a voltage with which insulation is desired to be ensured by the insulating member under a use environment of the inductor, the insulating member contacting a solid center portion of the core around which the wire is wound with the winding axis of the wire extending through the solid center portion, and the insulating member and the shielding member extending transverse to the winding axis of the wire.

2. The inductor according to claim 1, wherein the shielding member has a thickness within a range from 50 μm to 200 μm.

3. The inductor according to claim 2, wherein the insulating member has a thickness within a range from 1 μm to 100 μm.

4. The inductor according to claim 2, wherein
the outer electrodes are provided on a bottom face of the core; and
the shielding member and the insulating member are arranged over the top face and all side faces of the core.

5. The inductor according to claim 2, wherein
the outer electrodes are provided on a given side face of the core; and
the shielding member and the insulating member are arranged over the top face and side faces except the given side face of the core.

6. A DC-DC converter comprising:
a switching element;
a power inductor electrically coupled to the switching element, the power inductor being the inductor according to claim 2; and
a smoothing capacitor electrically coupled to the power inductor.

7. The inductor according to claim 1, wherein the insulating member has a thickness within a range from 1 μm to 100 μm.

8. The inductor according to claim 7, wherein
the outer electrodes are provided on a bottom face of the core; and
the shielding member and the insulating member are arranged over the top face and all side faces of the core.

9. The inductor according to claim 7, wherein
the outer electrodes are provided on a given side face of the core; and
the shielding member and the insulating member are arranged over the top face and side faces except the given side face of the core.

10. A DC-DC converter comprising:
a switching element;
a power inductor electrically coupled to the switching element, the power inductor being the inductor according to claim 7; and
a smoothing capacitor electrically coupled to the power inductor.

11. The inductor according to claim 1, wherein
the outer electrodes are provided on a bottom face of the core; and
the shielding member and the insulating member are arranged over the top face and all side faces of the core.

12. A DC-DC converter comprising:
a switching element;
a power inductor electrically coupled to the switching element, the power inductor being the inductor according to claim 11; and
a smoothing capacitor electrically coupled to the power inductor.

13. The inductor according to claim 1, wherein
the outer electrodes are provided on a given side face of the core; and
the shielding member and the insulating member are arranged over the top face and side faces except the given side face of the core.

14. The inductor according to claim 13, wherein
the shielding member and the insulating member are arranged over a portion of the given side face, the portion being out of contact with the outer electrodes.

15. A DC-DC converter comprising:
a switching element;
a power inductor electrically coupled to the switching element, the power inductor being the inductor according to claim 13; and
a smoothing capacitor electrically coupled to the power inductor.

16. A DC-DC converter comprising:
a switching element;
a power inductor electrically coupled to the switching element, the power inductor being the inductor according to claim 1; and
a smoothing capacitor electrically coupled to the power inductor.

* * * * *